United States Patent
Rührnössl et al.

(10) Patent No.: US 8,674,264 B2
(45) Date of Patent: Mar. 18, 2014

(54) METHOD FOR CLEANING A CONTACT TUBE OF A WELDING TORCH, AS WELL AS A WELDING TORCH AND A CONTACT TUBE

(75) Inventors: Manfred Rührnössl, Linz (AT);
Herbert Staufer, Neuhofen an der Krems (AT)

(73) Assignee: Fronius International GmbH, Pettenbach (AT)

( * ) Notice: Subject to any disclaimer, the term of this patent is extended or adjusted under 35 U.S.C. 154(b) by 1340 days.

(21) Appl. No.: 12/224,752

(22) PCT Filed: Jan. 29, 2007

(86) PCT No.: PCT/AT2007/000037
§ 371 (c)(1),
(2), (4) Date: Sep. 5, 2008

(87) PCT Pub. No.: WO2007/112461
PCT Pub. Date: Oct. 11, 2007

(65) Prior Publication Data
US 2009/0107971 A1    Apr. 30, 2009

(30) Foreign Application Priority Data
Apr. 4, 2006    (AT) .................................. A 573/2006

(51) Int. Cl.
*B23K 9/12*    (2006.01)
*B23K 9/16*    (2006.01)

(52) U.S. Cl.
USPC ............ 219/137.31; 219/121.53; 219/121.59; 219/121.48; 219/121.2; 219/137.61

(58) Field of Classification Search
CPC ........................................................ B23K 9/12
USPC ............ 219/136, 137.2, 137.31, 137.7, 137.8
See application file for complete search history.

(56) References Cited

U.S. PATENT DOCUMENTS

| | | | |
|---|---|---|---|
| 4,280,043 A | 7/1981 | Feix et al. | |
| 4,450,341 A | 5/1984 | Dietrick et al. | |
| 4,733,052 A | * 3/1988 | Nilsson et al. | ........... 219/137.61 |

FOREIGN PATENT DOCUMENTS

| | | |
|---|---|---|
| DE | 197 39 217 | 3/1999 |
| JP | 62-166077 | 7/1987 |
| JP | 64-20972 | 2/1989 |
| JP | 6-182555 | 7/1994 |
| JP | 11-104840 | 4/1999 |
| JP | 2001-246472 | 9/2001 |

OTHER PUBLICATIONS

Machine translation of JP11-104840, accessed May 14, 2012.*
Machine translation of JP06-182555, accessed May 14, 2012.*
International Search Report.
Japanese Office Action dated Aug. 16, 2011 along with an English translation of same in Japanese Application No. 2009-503361.
Austrian Office Action dated Dec. 15, 2006 in Austrian Application No. A 573/2006 along with an English translation of relevant portions of same.

* cited by examiner

*Primary Examiner* — Mark Paschall
(74) *Attorney, Agent, or Firm* — Collard & Roe, P.C.

(57) ABSTRACT

The invention relates to a method for cleaning a contact tube (20) of a welding torch (10), via which contact tube a welding wire (13) is supplied with electrical energy, said welding wire being moved towards the welding torch (10) by a wire reel (14) or a welding drum via a wire feeder (11), as well as to a welding plant (1) and a contact tube (20) for the welding torch (10) of such a welding plant (1). In order to prolong the service life of a contact tube (20) of a welding torch (10), the invention provides that the welding wire (13) is at least once moved backwards in the direction of the wire reel (4) or wire drum until the end (27) of the welding wire (13) lies at least within the length (36) of the contact tube (20), and that the welding wire (13) will subsequently again be moved forwards, in particular moved backwards into its starting position.

16 Claims, 6 Drawing Sheets

METHOD FOR CLEANING A CONTACT TUBE OF A WELDING TORCH, AS WELL AS A WELDING TORCH AND A CONTACT TUBE

CROSS REFERENCE TO RELATED APPLICATIONS

This application is the National Stage of PCT/AT2007/000037 filed on Jan. 29, 2007, which claims priority under 35 U.S.C. §119 of Austrian Application No. A 573/2006 filed on Apr. 4, 2006. The international application under PCT article 21(2) was not published in English.

BACKGROUND OF THE INVENTION

1. Field of the Invention

The invention relates to a method for cleaning a contact tube of a welding torch, via which contact tube a welding wire is supplied with electrical energy, said welding wire being moved towards the welding torch by a wire reel or a wire drum via a wire feeder.

Furthermore, the invention relates to a welding plant with a current source and a welding torch including a contact tube for supplying a welding wire with electrical energy, said welding wire being moved towards the welding torch by a wire reel via a wire feeder.

Finally, the invention also relates to a contact tube for the welding torch of an above-mentioned welding plant.

The invention relates to a welding method, wherein a welding wire is fed into the region of the welding torch by a wire reel or a wire drum. Here, the electric arc burns between the welding wire and the workpieces to be connected. To establish electrical contacting of the welding wire, the latter is guided through a contact tube which is arranged in the welding torch and connected with the current source. For this purpose, the contact tube has an internal bore through which the welding wire is fed to the workpiece. The welding current necessary for maintaining the electric arc between the welding wire and the workpiece flows via the contact tube into the welding wire. In order to achieve a low electrical resistance, it is required to appropriately adapt the internal bore in the contact tube to the welding-wire diameter and to design it to be only marginally larger. Additionally, the friction of the welding wire in the internal bore of the contact tube must not be too high, since otherwise problems may arise when moving the welding wire and, moreover, this may lead to higher abrasion of the welding wire. Usually, the diameter of the internal bore of the contact tube is chosen to be larger than the diameter of the welding wire by about 20%.

The present invention may be applicable in all those welding processes, in which a welding wire is used as a consumable electrode.

2. The Prior Art

During the welding process, the contact tube of the welding wire is heavily stressed. For example, one talks about a "leaking" contact tube, since the diameter becomes larger due to the friction of the welding wire, a spark erosion or secondary electric-arcs occurring in the internal bore of the contact. This is to be attributed to a mechanical stress of the internal bore of the contact tube that usually consists of well-conductive material, in particular of copper. As a consequence, over time, the contacting of the welding wire becomes worse and the welding process unstable. This allows only for secondary electric arcs to be formed which stress the contact tube even more and shorten its service life. The "leaking" of the contact tube becomes worse by particles present on, and carried by, the welding wire.

Another problem is the so-called "plugging" of the contact tube. Here, the abrasion caused by feeding the welding wire deposits in the internal bore of the contact tube and successively reduces the diameter of the bore of the contact tube. Optionally, the "plugging" of the internal bore of the contact tube is counteracted by increasing the power with which the welding wire is fed. However, this has a negative effect on the quality of the welding seam and causes additional abrasion, thus accelerating the further "plugging" of the internal bore of the contact tube.

Accordingly, the contact tube is a wearing part of the welding torch that has to be exchanged at relatively short time intervals. In order to remove the worn contact tube and to install a new contact tube, the welding plant has to be turned off and is not available for production purposes. Thus, particularly with robot welding plants, it is one of the primary objects to achieve a service life of the contact tube which is as long as possible, and to obtain intervals between exchanges of the contact tube which are as long as possible.

SUMMARY OF THE INVENTION

Thus, the object of the present invention resides in creating an above-mentioned cleaning method, thanks to which the contact tubes may be used longer. The method shall be as simple as possible and be implementable as quickly as possible and shall influence the welding process as little as possible. Finally, the cleaning method shall be as cost-effective as possible and as easy to implement as possible.

A further object of the present invention is to create an above-mentioned welding plant, by means of which the service life of the contact tubes can be increased as compared to usual welding plants.

Finally, a further object of the invention resides in creating a contact tube of longer service life to be used with the welding torch of an above-mentioned welding plant.

In terms of method, the inventive object is achieved in that the welding wire is at least once moved backwards in the direction of the wire reel until the end of the welding wire lies within the contact tube, and in that the welding wire is subsequently again moved forwards. The cleaning method is characterized by at least one backward movement of the welding wire and by a forward movement following thereupon, wherein the backward movement is effected to reach considerably farther, i.e., at least until it lies within the contact tube, than is the case with process-required backward movements of the welding wire. Thanks to this backward movement of the welding wire the abrasion accumulating in the interior of the contact tube is detached, partly carried away, and fed to rest behind the contact tube, wherein during the forward movement following thereupon, the detached abrasion will be fed outwards by the welding wire via the internal bore of the contact tube. The backward movement of the welding wire and the forward movement following thereupon may also be implemented in a very simple manner with existing welding plants by an appropriately control of the wire feeder. Depending on the contamination degree of the contact tube, several backward/forward movements of the welding wire may be provided for cleaning the contact tube. Since the backward and forward movement of the welding wire for cleaning the contact tube may be effected in a particularly quick manner, the welding process will be influenced only insignificantly.

During the last forward movement of the welding wire, the latter is preferably moved back into its starting position, and the welding process will be correspondingly continued from this position of the welding wire.

According to a further feature of the invention, it is provided that the welding wire is moved backwards at least along the entire length of the contact tube. Thus, all abrasion particles adhering to the welding wire can be fed to rest behind the contact tube and, there, be carried away by appropriate measures.

Moreover, these additional measures include, e.g., causing air, in particular compressed air, to flow over the region of the end of the welding wire in its pulled-back position. Thanks to the air the abrasion, which adheres to the welding wire and also accumulates at the end of the contact tube, can be blown off and the contact tube will no longer be blocked.

Likewise, it is possible to suck off the region of the end of the welding wire in its pulled-back position, whereby the abrasion can be selectively removed and collected. However, the abrasion is preferably fed outwards from the interior of the welding torch through the internal bore of the contact tube during the subsequent forward movement.

Another advantage can be achieved in that the end of the welding wire is melted on before it is moved backwards for cleaning purposes. Thereby, the free end of the welding wire is melted on into a spherical calotte of larger diameter, the latter serving as piston within the internal bore of the contact tube when the welding wire is pulled back, thus feeding all of the abrasion from the internal bore backwards and detaching the abrasion which will be conveyed outwards during the forward movement of the welding wire.

In order to prevent that the spherical calotte becomes too large, which renders impossible moving backwards the welding wire or allows for it only with high effort, the melting-on must be effected by impressing a certain welding current and/or a certain welding voltage over a certain period of time, as a function of the material of the welding wire used. By moving backwards the welding wire immediately after the free end of the welding wire has been melted on, the resulting and still hot spherical calotte may be deformed even more easily and be thus pressed through the internal bore of the contact tube.

In addition to melting on the end of the welding wire, it is also possible to mechanically deform the end of the welding wire before it is moved backwards for cleaning purposes, thus achieving a better cleaning effect.

This mechanical deformation may be achieved, e.g., by cutting off the end of the welding wire before it is moved backwards for cleaning purposes. Thus, sharp edges will result at the end of the welding wire, by means of which the abrasion present in the internal bore of the contact tube will be well detached and conveyed outwards.

In order to achieve a better cleaning effect, the welding wire may be moved backwards several times until the free end of the welding wire lies at least within the contact tube and may again be moved forwards. The number of backward/forward movements may be adapted according to the contamination degree of the contact tube. The cleaning of the contact tube may be done as a matter of routine, e.g., at the beginning of every welding process.

Likewise, it is also possible to at least once move backwards and forwards the welding wire at the end of every welding process so as to appropriately clean the contact tube.

The welding wire may be moved backwards/forwards for cleaning purposes also during the welding process.

In this context, the welding wire may be moved backwards/forwards as a function of the welding current and/or the welding voltage measured. The wear of the contact tube may be determined from the welding current and/or the welding voltage, thus allowing for a cleaning by means of the inventive backward and forward movement to be done.

The cleaning of the contact tube by moving backwards/forwards the welding wire may also be effected as a function of the current and/or the voltage of the wire feeder measured, since the degree of "plugging" of the contact tube may be determined or at least estimated from the current or the voltage of the wire feeder. The more the abrasion of the welding wire plugs the internal bore of the contact tube, the higher will be the current necessary for feeding the welding wire through the internal bore of the contact tube so that the cleaning process, i.e. the backward movement of the welding wire, within the contact tube and the forward movement of the same back into its starting position following thereupon will be effected when a desired value has been exceeded.

Likewise, it is also possible to move backwards and forwards the welding wire for cleaning the contact tube after a fixedly predetermined number of process-required forward/backward movements of the welding wire.

The backward/forward movement of the welding wire may be effected in a separate cleaning station, into which the welding torch will be positioned prior to cleaning. Thus, the time necessary for cleaning the contact tube will be increased, but use may be made of the additional measures present in the cleaning station, e.g. compressed air or sucking-off devices. This measure it particularly suited for robot welding plants which can be programmed appropriately.

The second inventive object is also achieved by an abovementioned welding plant, wherein a unit for controlling the wire feeder is provided to move backwards the welding wire at least once until the end of the welding wire lies at least within the length of the contact tube and to subsequently move forwards the same for cleaning purposes of the contact tube. Here, the corresponding control unit may be specifically provided for cleaning or be formed by the control unit already present for feeding the welding wire by appropriately reprogramming the same. The effort required for retrofitting such a welding plant is particularly low.

According to a further feature of the invention, a device for causing air to flow over the welding torch during the backward/forward movement of the welding wire done for cleaning purposes may be provided. By means of the flow device the abrasion adhering to the welding wire may be blown off. Here, additionally to cleaning by the aid of the welding wire, the step of blowing-off may be effected and/or supported by the protective gas necessary for the welding process.

Furthermore, a device may be provided for sucking-off the welding torch during the backward/forward movement of the welding wire done for cleaning purposes. Thus, the abrasion adhering to the welding wire may be selectively carried away.

In order to even more improve the cleaning of the contact tube by moving backwards/forwards the welding wire until it lies within the contact tube, a device for melting-on the free end of the welding wire may be provided. This melting-on device may be implemented by a separate device provided, e.g. in a corresponding cleaning station or the step of melting-on may be effected merely by increasing the welding current and/or the welding voltage for a short time.

Furthermore, it is of advantage if a device is provided for mechanical processing, in particular cutting-off, the free end of the welding wire before the latter is moved backwards/forwards for cleaning purposes.

According to a further feature of the invention, it is provided that the unit for controlling the wire feeder is connected with a unit for measuring the welding current and/or the welding voltage. Thus, the backward/forward movement of the welding wire required for cleaning may be done as a function of the welding current and/or welding voltage determined. The contamination of the contact tube causes a working-spot displacement which will be recognized by the control unit so that a cleaning process may be introduced when the contamination degree is too high.

Moreover or additionally, the unit for controlling the wire feeder may also be connected with a unit for measuring the current and/or the voltage of the wire feeder. Thus, the step of cleaning the welding wire may be effected as a function of the current and/or the voltage of the wire feeder, which are dependent on the plugging of the contact tube.

According to a further feature of the invention, at least one radial opening is provided on the contact tube. This radial opening on the contact tube allows for the abrasion adhering to the welding wire to be additionally carried away during the backward movement of the welding wire required for cleaning.

Here, the at least one radial opening is advantageously provided on that end of the contact tube opposing the discharge opening of the welding wire. At this end of the contact tube, usually most of the abrasion accumulates.

Advantageously, several peripherally-distributed openings are provided on the contact tube, via which the abrasion may be carried away. By appropriately connecting these openings, e.g. by means of a sucking-off apparatus, the abrasion may be removed in an even more effective manner.

Finally, the invention is also achieved by a contact tube for welding torches of an above-mentioned welding plant, said contact tube having at least one radial opening.

BRIEF DESCRIPTION OF THE DRAWINGS

The present invention will be explained in more detail by way of the enclosed figures. Therein.

DETAILED DESCRIPTION OF THE PREFERRED EMBODIMENTS

Figure 1:
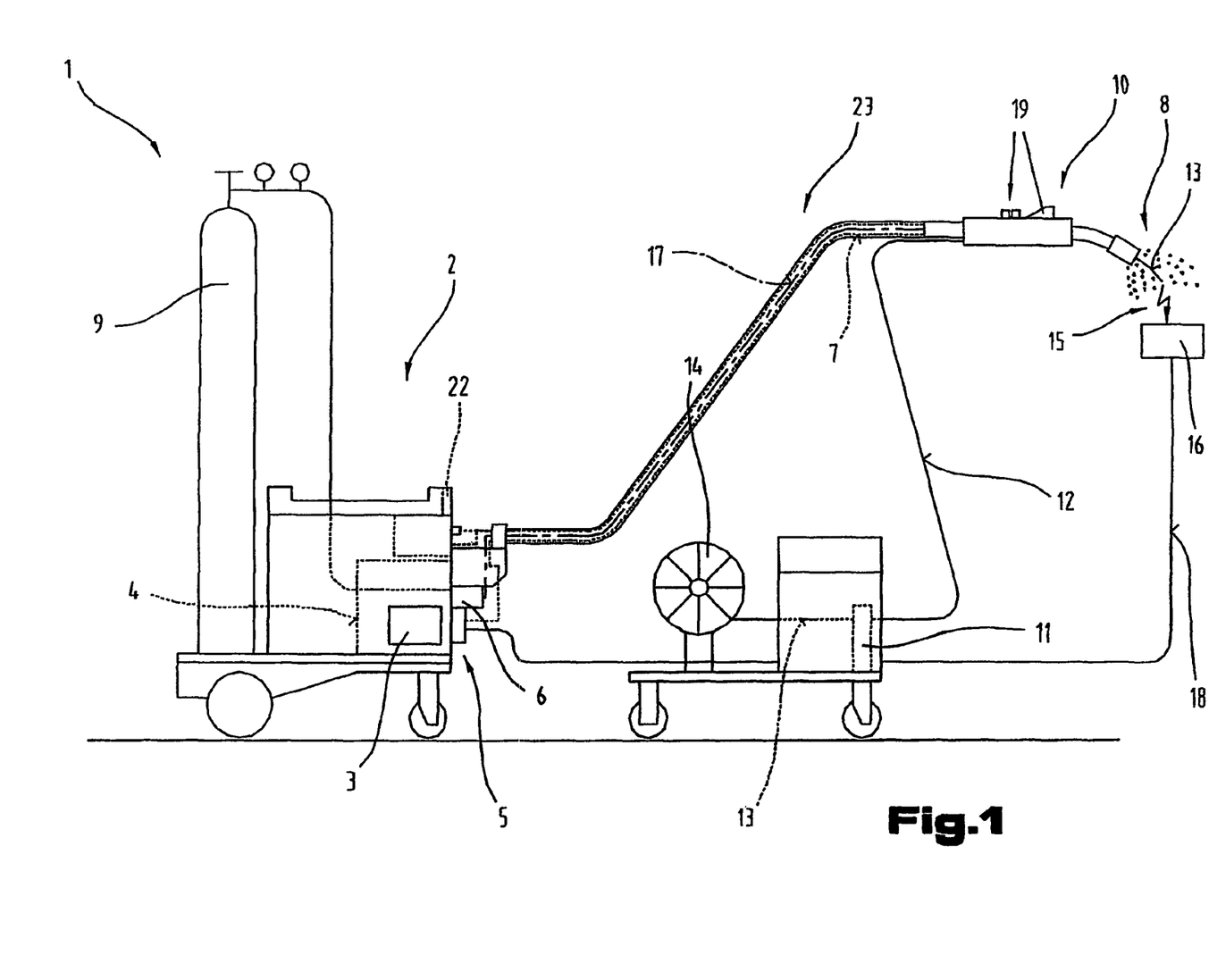
FIG. 1 shows a schematic illustration of a welding plant.

In FIG. 1, a welding plant 1 is shown for the most different welding processes, e.g. MIG/MAG welding and/or WIG/TIG welding or electrode welding, double-wire/tandem welding, etc.

The welding plant 1 comprises a current source 2 with a power element 3, a control unit 4 and a switching member 5 associated to the power element 3 and/or the control unit 4. The switching member 5 and/or the control unit 4 is (are) connected with a control valve 6 arranged between a gas reservoir 9 and a welding torch 10 in a supply line 7 for a protective gas 8, such as $CO_2$, helium or argon.

Moreover, a wire feeder 11, which is usual with MIG/MAG welding, may be activated via the control unit 4, wherein a welding wire 13 is fed into the region of the welding torch 10 by a wire reel 14 via a supply line 12. The wire feeder 11 may be designed as an accessory device or be integrated into the welding plant 1.

The current for establishing an electric arc 15 between the welding wire 13 and the workpiece 16 to be welded is fed from the power element 3 of the current source 2 to a contact tube 20 arranged in a welding torch 10 (cf. FIG. 2) via a welding line 17, wherein the workpiece 16 to be welded is also connected with the current source 2 via a further welding line 18. Different operation elements 19 may be provided on the welding torch 10 for adjusting different welding parameters.

Furthermore, the welding device 1 comprises an input and/or output device 22, via which the most different welding parameters, modes of operation or welding programs of the welding device 1 may be set and called. Here, the welding parameters, modes of operation or welding programs set via the input and/or output device 22 may be forwarded to the control unit 4 and, subsequently, the individual components of the welding plant 1 will be activated by the input and/or output device and/or it presets corresponding desired values for control purposes. The welding torch 10 is connected with the welding plant 1 via a hose package 23, the individual lines being provided therein.

Figure 2:
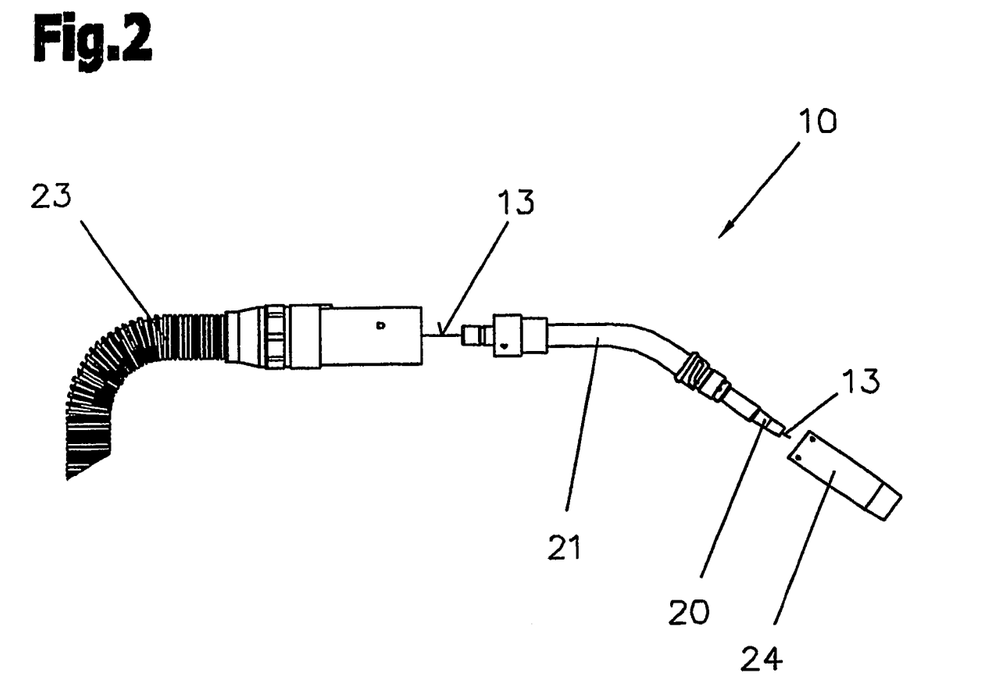
FIG. 2 shows an exploded view of a welding torch comprising a contact tube.

FIG. 2 shows an exploded view of a welding torch 10. The welding torch 10 comprises a pipe bend 21 to which the contact tube 20 is fastened. The gas nozzle 24 is arranged above the contact tube 20. The welding torch 10 is connected with corresponding lines via the hose package 23. The welding wire 13 may also be fed into the contact tube 20 of the welding torch 10 via the hose package 23.

Figure 3:
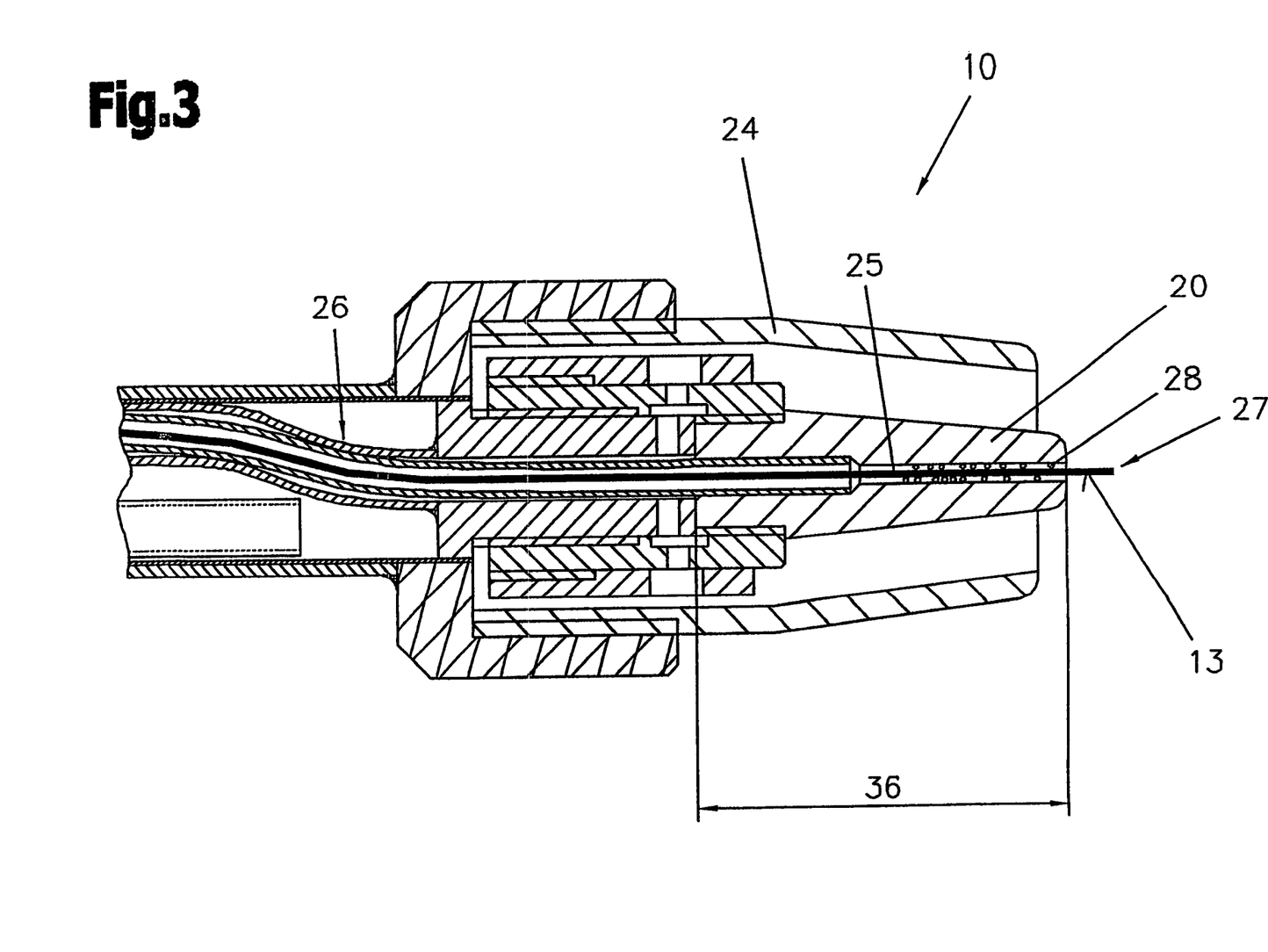
FIG. 3 shows a scaled-up sectional illustration of a contact tube arranged in a welding torch.

FIG. 3 shows a scaled-up sectional illustration through a contact tube 20 arranged in a welding torch 10. The contact tube 20 has an internal bore 25 having a diameter slightly larger than that of the welding wire 13 used. The welding wire 13 is fed to the contact tube 20, e.g. via a hose 26. The end 27 of the welding wire 13 sticks out of the contact tube 20 by a certain length, the so-called stick-out length. Usually, this free wire length is from 10 to 25 mm. By moving the welding wire 13, also the abrasion 28 is conveyed into the contact tube 20, there causing a gradual plugging of the internal bore 25, as schematically illustrated in the internal bore 25.

Figure 4:
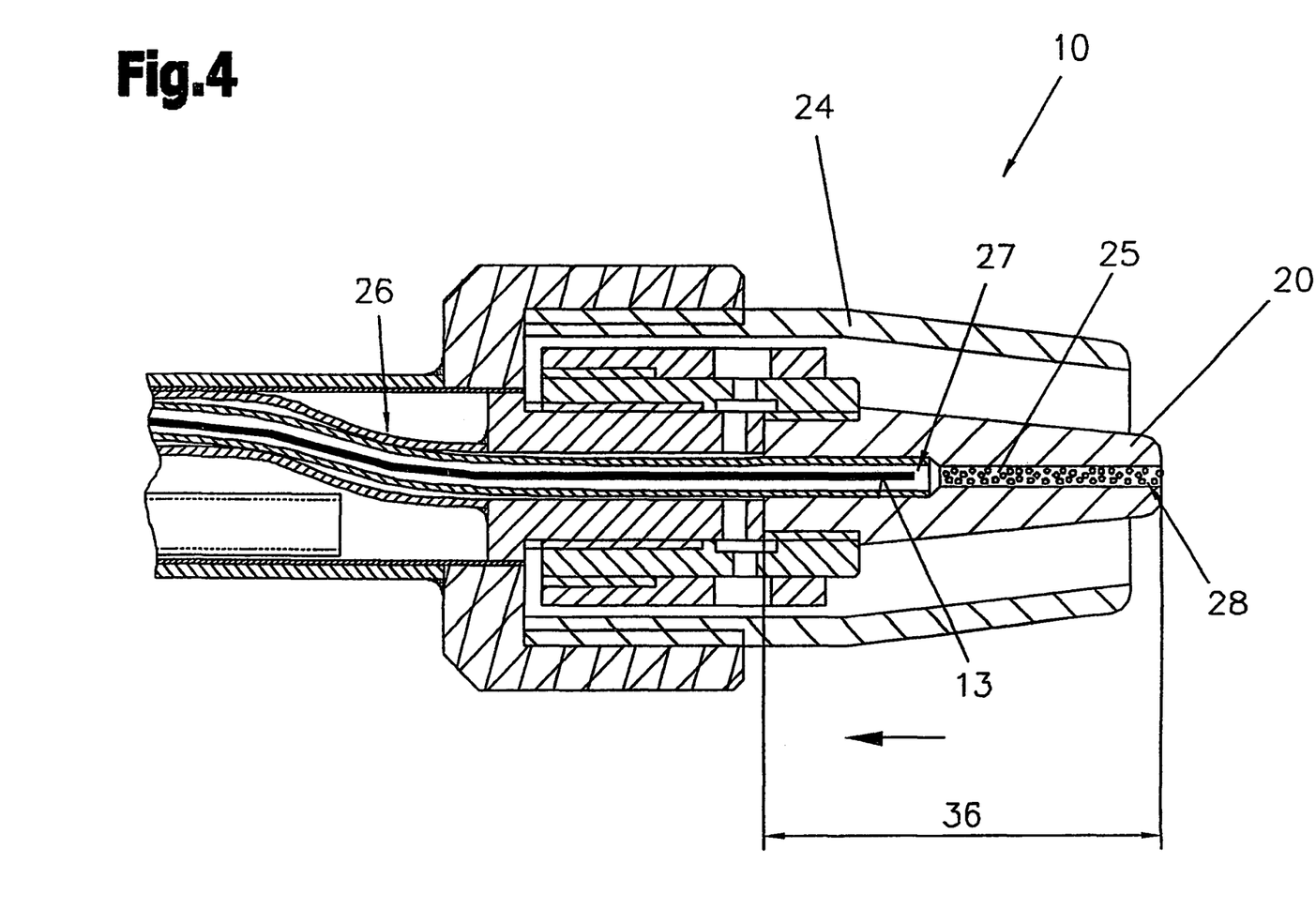
FIG. 4 shows the contact tube of FIG. 3, wherein the welding wire has been pulled back for cleaning purposes.
Figure 5:
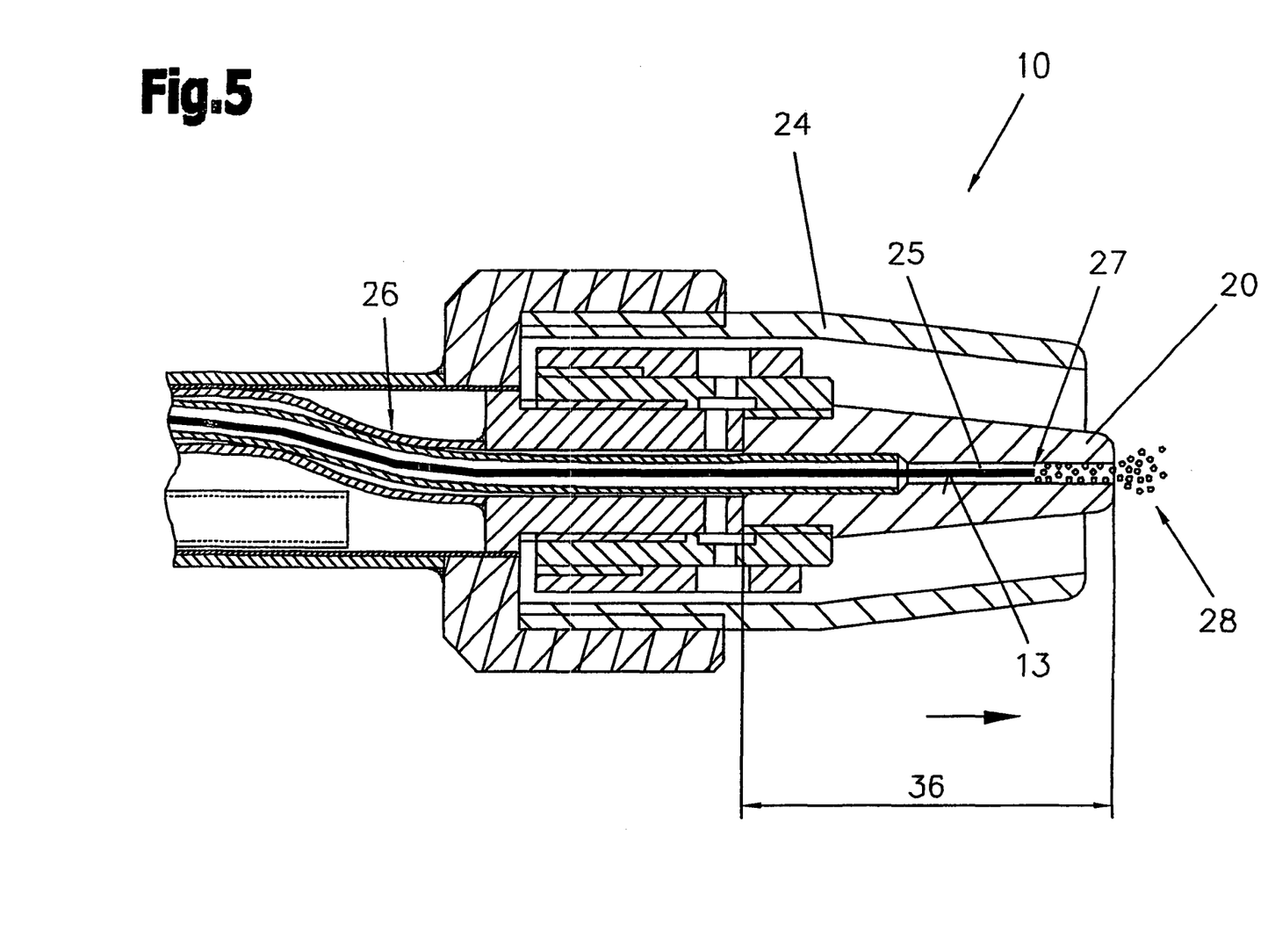
FIG. 5 shows the contact tube of FIG. 4, wherein the welding wire has been moved forwards for cleaning purposes.

As can be seen in FIGS. 4 and 5, according to the invention the welding wire 13 is moved backwards, i.e. away from the workpiece 16, until the end 27 of the welding wire 13 lies at least within the contact tube 20, i.e. in the hose 26 (FIG. 4). The welding wire 13 may also be moved backwards along the entire length 36 of the contact tube 20. By moving backwards/forwards the welding wire 13, as is apparent from FIGS. 4 and 5, the abrasion 28 is detached, carried away and drops out of the contact tube 20 or can be selectively conveyed away by appropriate measures, e.g. blowing or sucking-off. When moving backwards the welding wire 13, the abrasion is detached and, via the same, pushed outwards through the internal bore 25 during the forward movement of the welding wire 13 following thereupon. In this manner, the plugging of the internal bore 25 of the contact tube 20 will be decelerated and the service life of the contact tube 20 prolonged. Thus, there is no need to interrupt the welding process and change the contact tube 20 very often. After the welding wire 13 has been moved backwards, the latter is either moved forwards in the direction of the workpiece 16 into its original starting position and the welding process will be continued, or it is at least partly moved forwards and, again, once or several times moved backwards. By additional measures, e.g. openings 29 in the contact tube 20, removal of the abrasion 28 may be assisted (cf. FIG. 8).

Of course, it is possible that the welding wire 13 is not completely fed backwards from the contact tube 20 but only partly moved backwards into the interior bore 25 of the contact tube 20 and will subsequently be again moved forwards in the direction of the workpiece 16. It is also possible that the cleaning process consists of several successive cycles such that, e.g., the welding wire 13 is at first only fed backwards into the contact tube 20, subsequently will again be fed forwards, whereupon, e.g. in the following cycle, the welding wire 13 will be fed to its most backward position, i.e. into the hose 26, and will again be fed forwards by the same. Yet, this backward movement may also be even more fine-adjusted. Thus, virtually, a piece-by-piece cleaning of the contact tube 20 will be achieved.

An essential advantage resides in the fact that the cleaning of the contact tube 20 is effected without the use of current by the abrasion 28 due to the backward/forward movement of the welding wire 13 into the interior of the contact tube 20 so that no secondary electric arcs will occur and that the burning-on of the welding current 13 on the contact tube 20 will be prevented. Furthermore, it is also possible that the cleaning process is carried out after a welding process, wherein, e.g. after the welding process has been completed and before the cleaning process will be introduced, a timing member will be started so as to ensure an appropriate cooling of the welding wire 13, and the cleaning process will be started only after a certain period of time.

Figure 6:
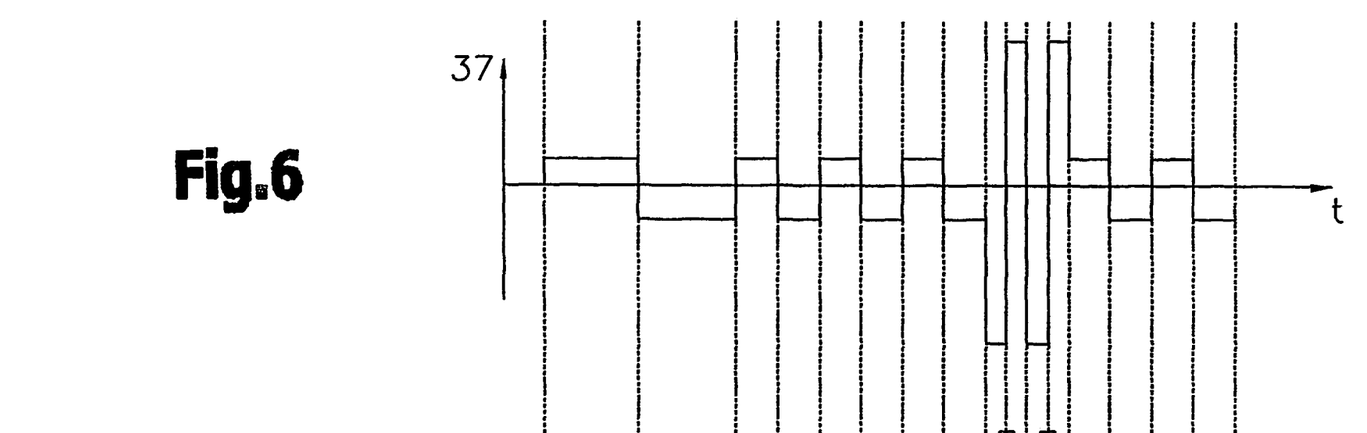
FIG. 6 shows the time course of the wire-feed speed during an inventive cleaning process.
Figure 7:
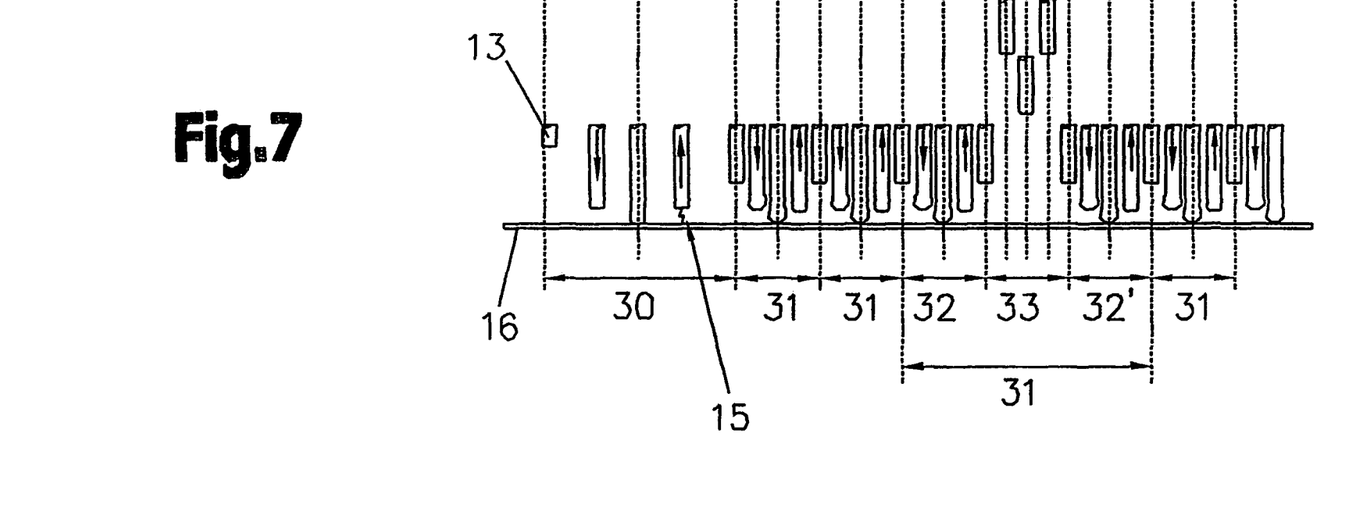
FIG. 7, by way of the example according to claim 5, shows a schematic illustration of the position of the welding wire relative to the workpiece as a function of time.

FIGS. 6 and 7 schematically show different time-course diagrams of the wire-feed speed 37 and the position of the welding wire 13 relative to the workpiece 16. During a starting phase 30, which serves for igniting and stabilizing the electric arc 15, the welding wire 13 is moved forwards in the direction of the workpiece 16, and by applying a corresponding welding voltage U and welding current I, will subsequently again be moved away from the workpiece 16, forming the electric arc 15. After the starting phase 30 has been completed, there will be several successive welding-process phases 31, depending on the welding process desired, during which phases, e.g., the welding wire 13 will be moved towards the workpiece 16 and, for assisting detachment of the drop, will again be moved away from the same, as is illustrated by a so-called CMT process (cold-metal-transfer process). Certainly, also other welding processes known, e.g. a spray-electric-arc process, a short-circuit process, a pulse process, etc., may be used. The corresponding speed course of the welding wire 13 during the welding-process phases 31 can be seen in FIG. 5. During the welding process an inventive cleaning phase 33 may be carried out during which the welding wire 13 will be moved backwards correspondingly quickly and correspondingly afar from the workpiece 16 such that the welding wire will end within the contact tube 20 and/or will be completely moved backwards, thus being pulled through the entire contact tube 20 back into the core, i.e. the hose 26. Subsequently, the welding wire 13 will again be moved forwards in the direction of the workpiece 16 and again be moved backwards and forwards into its starting position. The cleaning phase 33 is effected during a welding-process phase 31 divided up into two sections 32, 32'. Provided that the welding wire 13 will be moved backwards and forwards in a correspondingly quick fashion, the cleaning phase 33 may be in the region of several ms, which is why the welding process proper will not be significantly influenced by the cleaning. Likewise, it is also possible that the cleaning phase 33 is carried out at the beginning or at the end of the welding process and as a function of the welding current I and/or the welding voltage U or as a function of the current and/or the voltage of the wire feeder.

Figure 8:
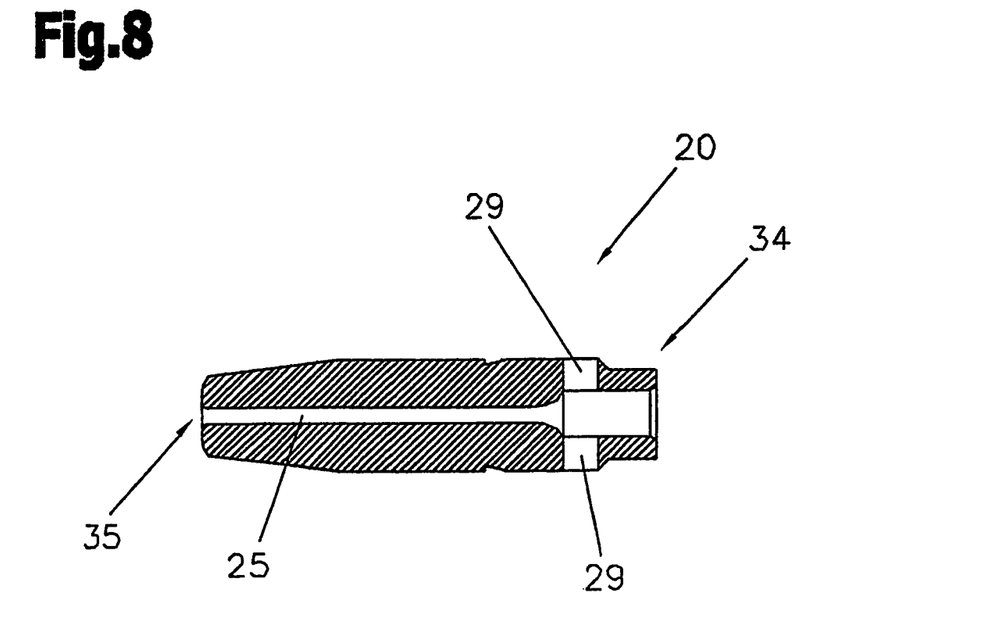
FIG. 8 shows a sectional illustration of an embodiment of a contact tube.

FIG. 8 shows an embodiment of a contact tube 20 which has at least one radial bore 29 on that end 34 opposing the discharge opening 35 of the welding wire 13. This radial bore 29 allows for the abrasion 28 of the welding wire 13 to be better carried away during the backward movement of the welding wire 13. Possibly, carrying away the abrasion 28 may be improved by the aid of compressed air or sucking-off devices (not shown). Here, it is also possible that the core, i.e. the hose 26, via which the welding wire 13 is fed to the welding torch 10, ends directly in front of the bore 29 so that the detached and pulled-back abrasion 28 can be blown off via the bore 29. Yet, it is preferred that the abrasion 29 is pushed out of the interior of the contact tube 20 by the forward movement of the welding wire 13.

Nevertheless, it is also possible for the cleaning process to be introduced automatically, i.e. that the control unit determines the contamination degree by evaluating the current and/or the voltage and that a cleaning process will correspondingly be introduced or not, i.e. that based on a standard value, changes occur during a welding process due to the wear of the contact tube. If a certain threshold value has been reached, a non-admissibly high wear of the contact tube 20 will be indicated and the latter will be cleaned, e.g. by means of the inventive method. After the contact tube 20 has been cleaned, the welding current ideally will be as high as the desired standard value.

Yet, it is also possible that the contamination degree of the contact tube 20 is determined by means of other parameters, in particular the motor current for wire feed. For this purpose, the motor current of a wire feeder is detected which starts at a certain standard value and increases due to the plugging of the contact tube until an inadmissibly high threshold value is reached. At this point of time the inventive cleaning method will be applied and the motor current may be ideally reduced to its standard value. After the threshold value has again been reached, a further cleaning step will be introduced. Yet, as is standard, the cleaning may also be done at the beginning and at the end of every welding process or after a certain number of welding-process phases has been reached or after a certain time of operation.

It is also possible that the cleaning process is not carried out by a continuous backward/forward movement of the welding wire 13 but by the welding wire 13 doing a so-called trembling motion during the forward movement and/or the backward movement. For example, the welding wire 13 may be pushed forwards out of the contact tube 20 by 2 mm during the forward movement and be subsequently again pushed backwards by 1 mm. This movement will be carried out until the welding wire 13 and its end have been fed out of the contact tube 20.

Of course, the cleaning process may also be used with hand-held welding torches.

The invention claimed is:

1. A method for cleaning a contact tube of a welding torch, via which contact tube a welding wire is supplied with electrical energy, the contact tube having a length and an internal bore, the method comprising steps of:
   moving said welding wire from a starting position and to the welding torch by a wire reel or a welding drum via a wire feeder, wherein friction against said welding wire during the moving of said welding wire forms abrasion particles from said welding wire, the abrasion particles accumulating in the internal bore of the contact tube,
   melting an end of the welding wire to form a welding wire end region of increased diameter,
   subsequently at least once moving the welding wire backwards to a pulled-back position in the direction of the wire reel or the welding drum until an end of the welding wire is at least within a selected portion of the length of the contact tube and such that the abrasion particles accumulated in the internal bore of the contact tube are detached from the welding wire, are partly carried away, and are fed to rest behind the contact tube, and subsequently moving the welding wire forwards again in a subsequent forward movement such that the abrasion particles in the contact tube are fed outwards via the internal bore of the contact tube, wherein the abrasion particles are also fed outwards from the contact tube via at least one radial opening in the contact tube during at least one of the backwards movement of the welding wire and the subsequent forwards movement of the welding wire, and wherein the welding wire end region of increased diameter acts as a piston within the internal bore of the contact tube during the backwards movement of the welding wire and during the subsequent forwards movement of the welding wire.

2. The cleaning method according to claim 1, wherein the welding wire is moved back into the starting position during the subsequent forward movement.

3. The cleaning method according to claim 1, wherein the welding wire is moved backwards at least along the length of the contact tube.

4. The cleaning method according to claim 1, wherein air is caused to flow over a region of the end of the welding wire in the pulled-back position.

5. The cleaning method according to claim 1, wherein a region of the end of the welding wire is sucked off in the pulled-back position.

6. The cleaning method according to claim 1, wherein as a function of a material of the welding wire used, the end of the welding wire is melted by impressing a certain welding current and/or a certain welding voltage over a certain period of time.

7. The cleaning method according to claim 1, wherein the end of the welding wire is deformed mechanically before it is moved backwards for cleaning purposes.

8. The cleaning method according to claim 7, wherein the end of the welding wire is cut off before it is moved backwards for cleaning purposes.

9. The cleaning method according to claim 1, wherein the welding wire is several times moved backwards until the end of the welding wire lies at least within the length of the contact tube and is again moved forwards.

10. The cleaning method according to claim 1, wherein at a beginning of a welding process, the welding wire is at least once moved backwards and forwards.

11. The cleaning method according to claim 1, wherein at an end of a welding process, the welding wire is at least once moved backwards and forwards.

12. The cleaning method according to claim 1, wherein during a welding process, the welding wire is at least once moved backwards and, again, forwards.

13. The cleaning method according to claim 12, wherein as a function of a welding current and/or a welding voltage measured, the welding wire is moved backwards and, again, forwards.

14. The cleaning method according to claim 12, wherein as a function of a current or voltage of the wire feeder of the welding wire measured, the welding wire is moved backwards and, again, forwards.

15. The cleaning method according to claim 12, wherein the welding wire is at least once moved backwards and, again, forwards corresponding to a fixedly predetermined number of process-required forward/backward movements of the welding wire.

16. The cleaning method according to claim 1, wherein the welding torch is positioned in a cleaning unit and, therein, the welding wire is at least once moved backwards and, again, forwards.

* * * * *